United States Patent [19]

Harrison et al.

[11] Patent Number: 4,715,414

[45] Date of Patent: Dec. 29, 1987

[54] CONCENTRIC WELL-TYPE EXTRACTOR TUBE FOR FILLING CONTAINERS WITH PRESSURIZED FLUID

[75] Inventors: David C. Harrison, Emmer Green; Brian Glover, Camperley, both of England

[73] Assignee: Grundy Dispense Systems, Inc., Canoga Park, Calif.

[21] Appl. No.: 919,314

[22] Filed: Oct. 15, 1986

Related U.S. Application Data

[63] Continuation-in-part of Ser. No. 700,085, Feb. 11, 1985, abandoned.

[51] Int. Cl.[4] .......................... F16L 37/12; B65B 3/18

[52] U.S. Cl. ...................................... 141/302; 141/18; 141/286; 222/400.7; 222/400.8; 137/212; 137/315; 137/322

[58] Field of Search ......................... 141/1, 18, 54–58, 141/59, 285, 286, 291–296, 301, 302, 304–306, 308–310; 137/212, 322, 315; 222/400.7, 400.8; 239/518, 519; 220/316, 319

[56] References Cited

U.S. PATENT DOCUMENTS

| | | | |
|---|---|---|---|
| 3,640,320 | 2/1972 | Elkuch | 141/59 |
| 3,737,106 | 6/1973 | Arnold et al. | 239/518 |
| 3,774,658 | 11/1973 | Abramoska et al. | 141/286 |
| 4,137,954 | 2/1979 | Brill et al. | 141/302 |
| 4,181,143 | 1/1980 | Fallon | 137/322 |
| 4,343,325 | 8/1982 | Fallon | 137/212 |
| 4,351,456 | 9/1982 | Nezworski | 222/400.7 |
| 4,363,336 | 12/1982 | Cerrato | 137/212 |
| 4,488,572 | 12/1984 | Brown et al. | 137/315 |
| 4,509,663 | 4/1985 | Fallon | 222/400.7 |

FOREIGN PATENT DOCUMENTS

| | | | |
|---|---|---|---|
| 1256007 | 12/1967 | Fed. Rep. of Germany | 141/302 |
| 2013809 | 8/1979 | United Kingdom | 137/212 |

*Primary Examiner*—Henry J. Recla
*Assistant Examiner*—Ernest G. Cusick
*Attorney, Agent, or Firm*—Thomas I. Rozsa

[57] ABSTRACT

A concentric well-type extractor tube having two concentric valves retained in a valve neck for filling containers, such as beer kegs, with pressurized beverages. The length of the valve neck is reduced so that the bottom of the valve neck is horizontally aligned with the top of a movable first valve assembly. The side openings of the depending basket portion of the extractor tube are raised to a position adjacent the first valve assembly. Therefore, beer filling an inverted keg can pass directly between a first valve seat and movable first valve member of the first movable valve assembly and thereafter through the openings in the basket and into the keg. This substantially shortens the beer flow path and eliminates the passage of beer through a constricted area found in prior art extractor tubes. Also, a transverse deflector plate serves to deflect beer from the center of the keg to the sidewalls, thereby substantially reducing turbulence during filling. The deflector plate can be retained on the siphon tube portion of the extractor tube, can be located within the depending basket portion of the siphon tube, or can be located on the top of the lip of the siphon tube adjacent the first valve seat, either as an extension of the lip or wedged between the top of the lip and bottom of the first valve seat.

20 Claims, 13 Drawing Figures

CONCENTRIC WELL-TYPE EXTRACTOR TUBE FOR FILLING CONTAINERS WITH PRESSURIZED FLUID

BACKGROUND OF THE INVENTION

This patent application is a continuation-in-part of U.S. patent application Ser. No. 700,085, filed 02/11/85, now abandoned.

1. Field of the Invention

The present invention relates to concentric well-type extractor tubes, for filling and emptying pressurized vessels, such as beer kegs, More particularly, the present invention relates to improved extractor tubes, which improve the filling process.

2. Description of the Prior Art

A detailed description of prior art concentric well-type extractor tubes will be set forth in the Detailed Description of the Preferred Embodiment Section. In general, the extractor tube assembly is housed within a valve neck, which in turn is welded onto the container to form its opening. Housed within the extractor tube assembly is the sealing member of the container, which is usually maintained under pressure when in use.

Conventional well-type extractor tubes include two concentric valves. The first valve assembly includes a valve body, whose interior lower surface provides a valve seat and the moveable valve member of the lower first valve assembly. Also included is a ball valve which abuts a ball valve seat comprising a portion of the moveable (first) valve assembly. When the valves are open, a first flow path is defined between the valve seat and the valve member of the first valve assembly. A second flow path is defined between the ball valve seat and the ball valve, for admitting and exhausting carbon dioxide during filling of the keg which is kept upside down while it is being filled, and for dispensing beer during normal use with the keg right-side up. The two valves are opened by opening means associated with the filling apparatus. The beer flows through the first flow path, consisting of the first valve assembly, the narrow opening between the valve body and sidewall of the moveable first valve member and an associated siphon tube, in alignment with the vertical wall of the first valve member. Then the bear travels through a plurality of openings at the lowermost portion of the valve housing member section (conventionally referred to as the "basket" of the extractor tube, in the industry) of the extractor tube and then into the keg or container.

In prior art concentric well-type extractor tubes, the lowermost portion of the valve neck extends below the first moveable valve assembly (that is up and down relative to the orientation shown in FIG. 1). Therefore, the associated valve body also extends below the first moveable valve assembly, thereby creating a vertical passage between the lower section of the valve body and the vertical portion of the first moveable valve member and associated siphon tube. As a result, the openings at the lowermost portion of the valve housing member section, or basket, of the extractor tube, through which the beer travels prior to entering the keg, are set well below the opening point of the first valve assembly and below the constricted vertical path between the lower section of the valve body and the vertical section of the moveable first valve member and siphon tube.

Several difficulties are encountered when such prior art extractor tubes are used. The long, constricted travel path of the beer, creates substantial turbulence, which in turn creates an excessive amount of foam as beer is ejected into the keg. Controlling the amount of foam requires application of a greater carbon dioxide counterpressure to the keg during filling to reduce the amount of foam. This in turn leads to excessive pressure in the container, which causes more carbon dioxide to dissolve in the beer (that is, more carbon dioxide pickup) and resulting in concentrations of carbon dioxide in the beer that exceed product specifications.

Second, when conventional extractor tubes are used, the beer gushes upward into the keg, which may trigger a sensing device in the filling apparatus, which will indicate that the keg is full when it is not, prematurely shutting-off the filling apparatus. This results in partially filled kegs, which must be rejected, removed from the filling line, and refilled. This is an expensive process that is difficult to automate. The tendency of the prior art extractor tubes to fill many kegs only partially is exacerbated by the excess foam created during filling. For these reasons, the prior art extractor tube designs reduce filling plant performance due to inherent design limitations.

These significant disadvantages of the prior art extractor tube designs are a serious problem in the brewing industry. Therefore, a significant need exists for a concentric well-type extractor tube that will permit brewers and other manufacturers of carbonated beverages to fill containers faster and with a lower rejection rate that the prior art. Additionally, a significant need exists for a device that can be readily fitted to a prior art concentric well-type extractor tube that will significantly increase the efficiency of a prior art extractor tube.

SUMMARY OF THE PRESENT INVENTION

The present invention provides improved designs for concentric well-type extractor tubes and improves filling performance so that the keg of beer can be filled rapidly with a minimum of turbulence and foam, insuring a complete fill of the keg with a minimum retention of carbon dioxide in the beer.

It has been discovered according to the present invention, that if the vertical length of the valve neck is reduced so that the bottom of the valve neck is horizontally aligned with the top of the moveable first valve assembly, then the first valve seat (retained within the valve neck) also terminates at the bottom of the valve neck. With this modification, the side openings in the basket are raised to a position adjacent to the face of the first valve seat of the first valve assembly. With this improved design, beer filling the inverted keg does not have to pass through the constricted passageway between the lowermost portion of the valve seat and the vertical portion of the moveable first valve member, as it does in the prior art. Instead, the beer only travels along the first flow path between the first valve seat and moveable first valve member and then directly through the openings in the basket and into the keg. Using the extractor tube according to the present invention, the keg can be filled faster with less turbulence at any given pressure.

It has also been discovered according to the present invention that the pressure drop across the filling flow path from filling apparatus to the keg is substantially reduced. The decreased pressure drop further reduces the turbulence and associated foam, thereby reducing the problems associated with the foam, and reduces the carbon dioxide counterpressure required to control the foam. The reduction of foam assures that the filling apparatus sensor will not be prematurely triggered, thereby assuring that the keg will be filled before the filling apparatus is turned off.

It has additionally been discovered, that the present invention reduces the necessity for high carbon dioxide top pressure in the barrel during filling. High carbon dioxide top pressure causes excessive concentrations of carbon dioxide to dissolve in the beer (carbon dioxide pickup). This advantageous result is due to the shortened and far less restricted flow path of the beer.

Because the keg is filled faster, there is less time for carbon dioxide counterpressure gas to dissolve in the beer. Additionally, a lower counterpressure can be used (carbon dioxide counterpressure is injected through the bail valve and the siphon tube to reduce foaming).

It has been further discovered, according to the present invention, that with the improved extractor tube design, the first valve assembly acts as a deflector, further improving the filling cycle by deflecting the beer directly through the openings in the basket, further reducing the pressure drop of the system, turbulene, jetting and the associated creation of foam, and the tendency of the beer to gush directly upward, which may prematurely trigger the keg-full indicator, allowing beer to enter the keg fastener at any given pressure, and reducing the necessity for high carbon dioxide top pressure in the keg during filling.

It has also been discovered, according to the present invention, that a transverse deflector means, which may be a deflector plate, placed adjacent to the top of the siphon tube and immediately below the moveable first valve member significantly improves filling efficiency. A deflector means according to the present invention may be embodied in any of a number of forms, including: (1) a separated element positioned transversely between the valve and the siphon tube; (2) an integral component of the siphon tube; or (3) a deflector plate molded into the moveable portion of the first valve.

It has also been discovered, according to the present invention, that the filling performance of prior art concentric well-type extractor tubes is dramatically improved by installation of a transverse deflector plate along the siphon tube adjacent to the ball valve assembly.

A deflector means, or deflector plate, acccording to the present invention improves the efficiency of filling a keg with beer for two reasons. First, the deflector means prevents most of the beer from gushing upward like a geyser toward the (inverted) bottom of the keg. When the beer gushes directly upward, it flows, across the first compression spring 310 (see FIG. 1), which is a coil spring wrapped around the siphon tube, and the bottom of the basket. Both of these elements include many edges and irregular surfaces, which increase turbulence in the beer, and the associated foaming. By preventing most of the beer from flowing over these irregular surfaces, the deflector means significantly reduces turbulence and foam. Second, the deflector means deflects the flow of beer so that it flows outwardly from the extractor tube assembly toward the internal sidewalls of the keg, eliminating the tendency of the beer to gush straight up into the bottom of the keg, where it may prematurely trigger the keg-full sensor. It is believed that these two reasons adequately explain the dramatically improved performance of an extractor tube fitted with a deflector plate. This analysis applies to both an extractor tube according to the present invention, and to a prior art extractor tube retrofitted with a deflector means according to the present invention.

It is therefore an object of the present invention to provide a concentric-well type extractor tube that reduces the pressure drop from the filling apparatus to the interior of the keg during filling.

It is another object of the present invention to provide an improved extractor tube that reduces turbulence and gushing (and the associated creation of foam) during filling, under both normal and high-speed fill conditions.

It is another object of the present invention to provide an improved extractor tube design that will fill kegs faster at any given pressure.

It is an additional object of the present invention to provide an improved extractor tube design which reduces the necessity for high carbon dioxide top pressures in the keg during filling, which in turn reduces carbon dioxide pickup by the beer.

It is an additional object of the present invention to provide a device that can easily be installed on an existing prior art extractor tube at minimal cost that will significantly increase performance of the prior extractor tube, permitting significantly more efficient use of the capital investment in filling equipment.

Further novel features and other objects of the present invention will become apparent from the following detailed description, discussion and the appended claims taken in conjunction with the drawings.

DRAWING SUMMARY

Referring particularly to the drawings for the purpose of illustration only, and not limitation, there is illustrated:

DETAILED DESCRIPTION OF THE PREFERRED EMBODIMENT

Although specific embodiments of the invention will be described with reference to the drawings, these embodiments are merely illustrative of many possible actual reductions to practice that rely on the principles of the invention. Various changes an modifications obvious to one skilled in the art to which the invention pertains are deemed to be within the spirit, scope, and contemplation of the invention as further defined in the appended claims.

PRIOR ART CONCENTRIC EXTRACTOR TUBE DEVICE

Figure 1:
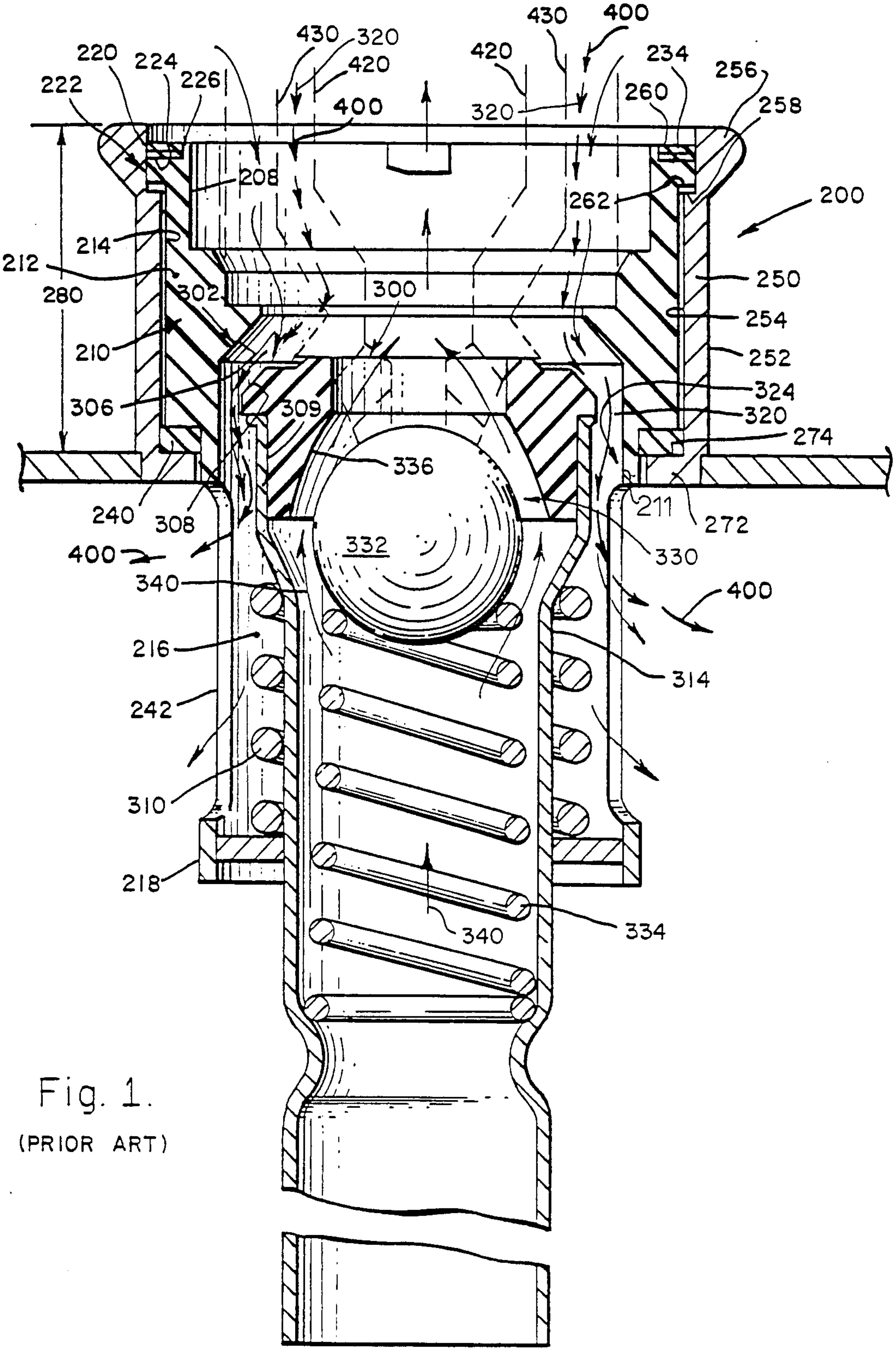
Fig. 1. (PRIOR ART)
FIG. 1 is a cross-sectional elevation of an extractor tube according to the prior art, which includes two concentric valve assemblies, a basket and a siphon tube.

It is believed that the present invention will be easier to understand if a detailed description of a prior art concentric extractor tube device is presented first. A prior art extractor tube assembly, which can be used for filling and emptying pressurized containers such as beer kegs is shown in FIG. 1. Extractor tube assembly 200 includes valve neck 250, which is welded onto the container (not shown). Valve neck 250 is of generally cylindrical configuration with an outer surface 252 and an inner surface 254. Annular groove 258 extends around the entire inner circumference of inner surface 254 adjacent to the top of valve neck 250. Annular groove 258 further includes upper surface 260 and lower surface 262. Valve neck 250 also includes lower inwardly extending surface 272, which extends radially inward forming an internal ring on the lower surface and inward of the interior surface 254 of valve neck 250. This lower internal surface or ring 272 includes upper surface 274.

Referring to FIG. 1, Valve body 210 has substantially cylindrical upper portion 212, which contains an exterior surface 214, which abuts interior surface 254 of valve neck 250. The upper portion of valve neck 250 contains a protruding portion 256.

Located beneath valve body 210 is valve housing member, or basket 216 which contains an exterior surface 218. Basket 216 includes a plurality of openings 242 which open into the beer keg. Located between basket 216 and first valve body 210 is a seal 240, such as compressed O-ring 240. Top portion 220 of first valve body 210 includes annular step 222, consisting of annular shoulder 224 and internal wall 226. Internal wall 226 is adjacent shoulder 224, and extends around the entire circumference of the inner periphery of the annular shoulder 224. Valve body 210 is hollow, allowing inner surface of the wall 226 to coincide with the inner wall 208 of the valve body 210. Valve body 210 is held within valve neck 250 by retaining ring 234 seated in annular groove 258 for a portion of its width and which rests on top of shoulder 224 and abuts internal wall 226.

Also illustrated in FIG. 1 is standard valve assembly 300 conventionally found in concentric well-type extractor tubes. Standard valve assembly 300 includes two concentric valves, including first valve assembly 302 and ball valve assembly 330. First valve assembly 302 is normally closed. In the closed position, moveable first valve member 308 is retained against first valve seat 306, by first compression spring 310, retained within basket 216.

Siphon tube 314 runs toward the bottom of the keg, allowing counterpressure to be injected into the keg during filling, and allowing beer to be withdrawn from the keg during use. Moveable first valve member 308 is seated in the top of siphon tube 314.

Force from first compression spring 310, retained within basket 216, presses first valve member 308 against first valve seat 306, keeping first valve assembly 302 normally closed. When first valve assembly 302 is open (as illustrated in FIGS. 1–6, and 7–9), beer flow path 320 is defined between first valve seat 306 and moveable first valve member 308.

Ball valve assembly 330 includes ball valve 332, which is normally closed due to force exerted by second compression spring 334, which is retained within siphon tube 314. The lower interior portion of moveable first valve member 308 includes ball valve seat 336 for ball valve 330. The top of second compression spring 334 presses against the lower portion of ball 332, retaining it against ball valve seat 336. When ball valve assembly 330 is in the open position, second flow path 340 is defined between ball valve seat 336 and ball 332.

Beer kegs are filled under pressure. The keg and the associated concentric extractor tube apparatus are inverted so that the entire assembly is upside down during filling. The filling apparatus (not shown) contains valve opening members that open the two concentric valves.

Referring to FIG. 1, the filling apparatus valve opening members 420 and 430 (only their positions are indicated) are pushed against moveable first valve member 308, forcing it away from first valve seat 306, opening first flow path 320. Simultaneously, the opening apparatus pushes against ball 332 forcing it away from ball valve seat 336, opening second flow path 340. Beer 400 is forced into the keg from the filling apparatus and travels along first flow path 320 between first valve seat 306 and moveable first valve member 308. Beer 400 then continues along constricted passageway 324, located between lower inner wall 211 of valve body 210 and, siphon tube 314 and moveable first valve member 308. Beer 400 is then ejected through openings 242 in basket 216 and into the beer keg. As beer 400 is filling the keg, carbon dioxide is expelled through second flow path 340 between second valve seat 336 and ball 332, along the direction of arrow 340.

Several major problems are associated with filling beer kegs using conventional prior art concentric extractor tubes, such as that shown in FIG. 1. First, beer 400 is forced to travel through a long constricted travel path, which includes travel from the filling apparatus through the first flow path 320 between the valve seat 306 and moveable valve member 308 of the first valve assembly, then through narrow passageway 324 between the lowermost vertical portion 211 of valve body 210 and vertical section 309 of moveable first valve member 308 and associated siphon tube 314, and then out openings 242 in basket 216, which creates excess turbulence and foam. Controlling the excess foam requires injection of higher carbon dioxide counterpressure into the container prior to filling with beer to control the foam. The excessive pressure in the container causes more carbon dioxide to be dissolved in the beer. The problem of carbon dioxide to pickup results in concentrations of carbon dioxide in the beer in excess of product specifications. In addition, greater fill pressure is required due to the substantial pressure drop along the beer flow path from the filling apparatus to openings 242 in basket 216.

Second, beer 400 flows through narrow passageway 324 between the vertical lowermost portion 211 of valve body 210 and vertical portion 309 of first valve member 308 and siphon tube 314. Narrow passageway 324 restricts the flow of beer, which significantly increases the filling time.

Third, the creation of the excessive foam due to the turbulence caused by the force of filling pressure through narrow passageway 324 and through opening 242 in basket 216 causes beer 400 to gush upward into the container, which can trigger a sensing device in the filling apparatus, indicating that the keg is full and shutting off the filling apparatus when the keg is not full.

THE PRESENT INVENTION

Figure 2:
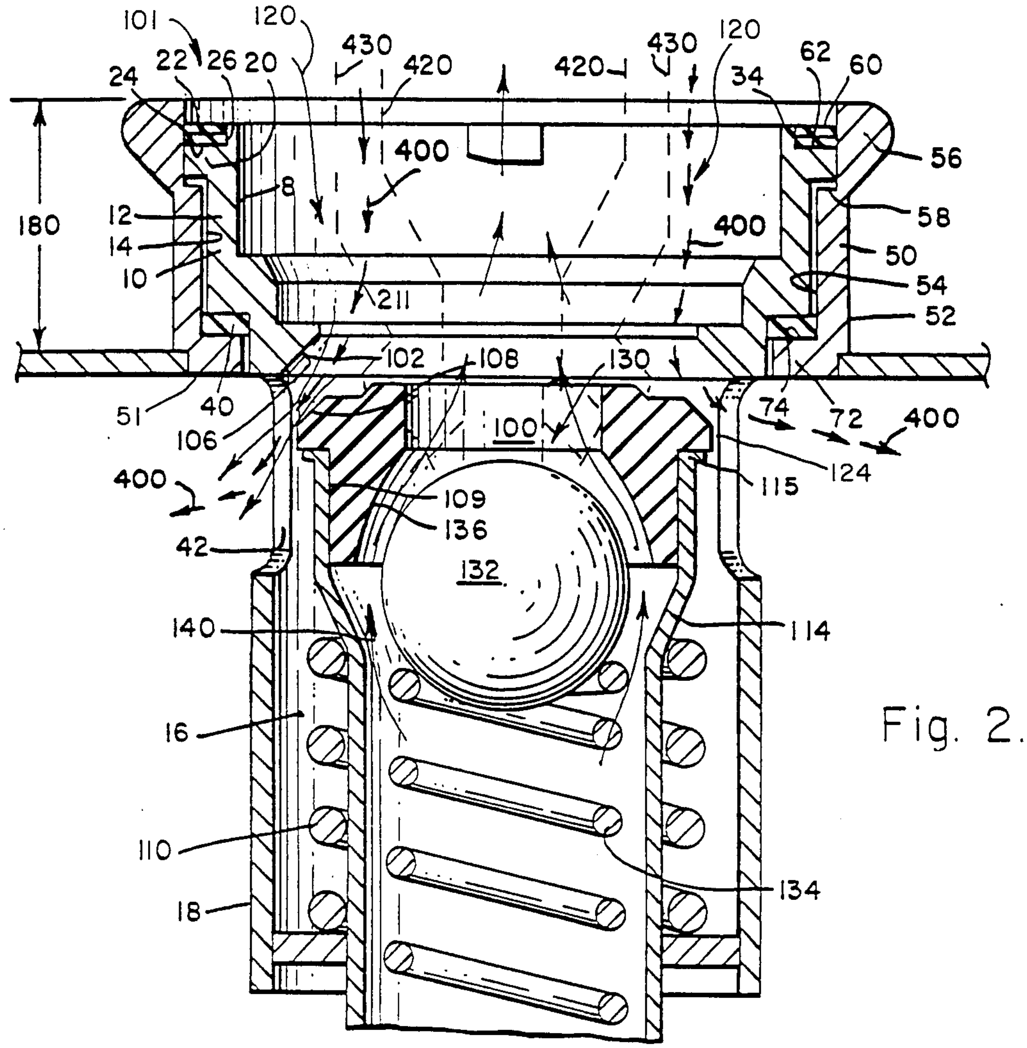
FIG. 2 is a cross-sectional elevation of the present invention extractor tube assembly, which includes two complete valve assemblies, a basket and a siphon tube.

The present invention concentric well-type extractor tube is shown in FIG. 2. Referring to FIG. 2, valve neck 50 is welded onto the container (not shown) to form its opening. Valve neck 50 is of generally cylindrical configuration and includes outer surface 52 and inner surface 54. Annular groove 58 extends around the entire inner circumference of inner surface 54 adjacent to the top of valve neck 50. Annular groove 58 further includes upper surface 60 and lower surface 62. Valve neck 50 also includes a lower inwardly extending surface or ring 72, which extends radially inward to form an internal ring on lower surface 51 and inward of the interior surface 54 of valve neck 50. Lower internal surface or ring 72 further includes upper surface 74. These elements are substantially the same as the corresponding prior art elements and are mentioned here only for the sake of completeness.

Also illustrated in FIG. 2 is valve body 10, which includes upper cylindrical portion 12 having exterior surface 14, which abuts interior surface 54 of valve neck 50. The upper portion of valve neck 50 contains protruding portion 56. Gasket 40 seals the interface of basket 16 and valve body 10. Basket 16 includes a plurality of openings 42, which open into the beer keg.

Top portion 20 of valve body 10 has annular step 22, consisting of annular shoulder 24 and internal wall 26 on the top of valve body 10. Internal wall 26 is adjacent to shoulder 24 and extends around the entire circumference of the inner periphery of annular shoulder 24. Valve body 10 is hollow, allowing the inner surface of wall 26 to coincide with inner wall 8 of valve body 10. Valve body 10 is held within valve neck 50 by retaining ring 34, which is inserted into annular groove 58 for a portion of its thickness and which rests on top of shoulder 24 and abuts internal wall 26. These elements are substantially the same as the corresponding elements of the prior art and are discussed here only for the sake of completeness.

Also illustrated in FIG. 2 is conventional valve assembly 100 used for filling and dispensing beer from kegs. Standard valve assembly 100 consists of two concentric valves, which are first valve assembly 102 and ball valve assembly 130. Moveable first valve member 108 is seated in the top of siphon tube 114, which is parallel to first compression spring 110. Force from first compression spring 110 presses moveable first valve member 108 against first valve seat 106, retaining first valve assembly 102 in a normally closed position. When first valve assembly 102 is open, first flow path 120 is defined between first valve seat 106 and moveable first valve member 108.

Ball valve assembly 130 includes ball valve member 132, which is supported by second compression spring 134, which in turn is retained within siphon tube 114. The bottom of moveable first valve member 108 forms ball valve seat 136 for ball valve 130. Second compression spring 134 presses against ball 132, retaining it against ball valve seat 136 so that ball valve assembly 130 is normally closed. When ball valve assembly 130 is open, second flow path 140 is defined between second valve seat 136 and ball valve member 132, and downward through siphon tube 18. Ball valve assembly 130 is entirely conventional and is discussed herein merely for the sake of completeness.

A comparison of FIGS. 1 and 2 clearly demonstrates the improvements of the present invention (as disclosed in FIG. 2) over the prior art embodiment (as shown in FIG. 1). Vertical length 280 of valve neck 250 is substantially reduced in the present invention vis-a-vis the prior art, so that the lowermost portion of valve neck 50 (FIG. 2) is aligned with first valve assembly 102 (FIG. 2). For example, if vertical length 280 in the prior art valve neck 250 as shown in FIG. 1 is approximately 1.2 inches, then vertical length 180 of valve neck 50 according to the present invention (FIG. 2) is approximately 0.82 inches. As a result, there is a three way intersection between the valve body 10, the valve housing member 16, and the side openings 42. Therefore, the first valve assembly 102 is located adjacent the three way intersection of the valve body 10, the valve housing member 16 and the side openings 42.

In an extractor tube according to the present invention, lowermost portion 51 of valve neck 50 is aligned with first valve seat 106 and the face of moveable first valve member 108. Further, side openings 42 in basket 16 are adjacent to the face of first valve seat 106 of first valve assembly 102, and the uppermost portion of openings 42 lies immediately below first valve seat 106.

Through this improved design, beer 400 entering the inverted container does not follow first flow path 320 of FIG. 1, that is, around moveable first valve member 308 and along constricted passageway 324 between the lowermost portion of valve body 210 and vertical portion 309 of moveable first valve member 308 (FIG. 1, Prior Art). In contrast, an extractor tube according to the present invention provides beer flow path 120 (FIG. 2) between first valve seat 106 and moveable first valve member 108 and then directly through openings 42 in basket 16 and into the container.

An extractor tube assembly according to the present invention can fill a keg with beer faster and under less pressure than a prior art extractor tube can. Furthermore, the pressure drop across the filling flow path is substantially reduced. Beer 400 only needs to flow through flow path 120 between first valve seat 106 and first valve member body 108. Since valve member 108 acts as a deflector, beer 400 flows directly outward from openings 42 toward the sidewalls of the keg, instead of gushing upward. As a result, turbulence and foam in the beer are significantly reduced. The reduction of turbulence upward, that is, toward the upturned bottom of the keg, where the filling sensor is located, assures that the sensing device that turns off the filling apparatus will not be prematurely triggered, assuring that the kegs will be filled with beer when the filling apparatus is turned off. The reduction of the pressure drop and turbulence across the flow path reduces the necessity for high carbon dioxide top pressures in the keg during filling.

Figure 3:
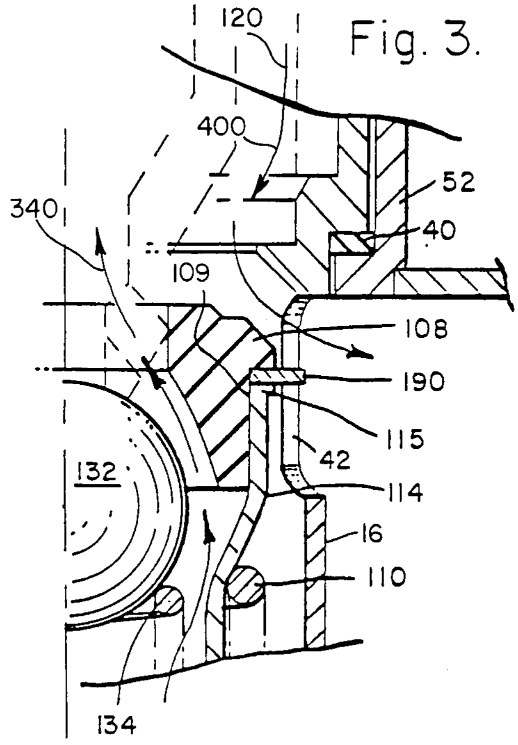
FIG. 3 is a fragmentary cross-sectional elevation of the present invention extractor tube assembly as disclosed in FIG. 2, with the addition of a transverse deflector plate adjacent the top of the siphon tube and immediately below the moveable first valve member.

An improved embodiment of the present invention extractor tube assembly 1 (of FIG. 2) is shown in FIG. 3, which includes a transverse deflector means, such as deflector plate 190 adjacent to top 115 of siphon tube 114 and immediately below moveable first valve member 108.

Figure 4:
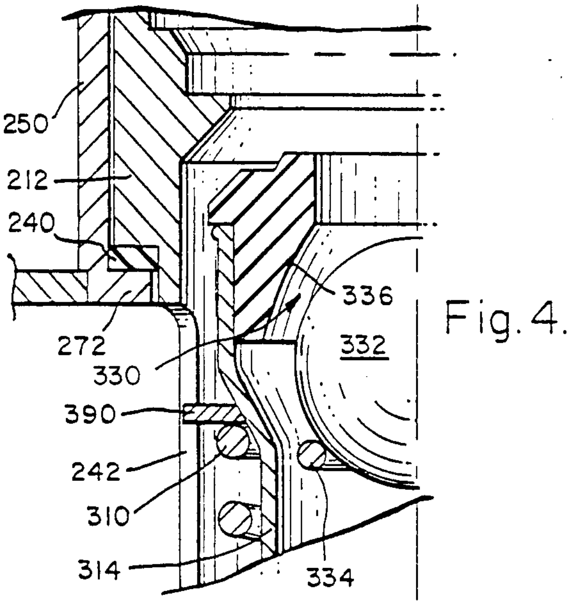
FIG. 4 is a fragmentary cross-sectional elevation of the extractor tube assembly as disclosed in FIG. 1, but including a washer-like transverse deflector plate located on the siphon tube according to the present invention.

An improvement in prior art extractor tube assemblies 200 such as that shown in FIG. 1 is shown in the fragmentary elevation of FIG. 4, which includes installing a transverse deflector means, such as deflector plate 390 along the length of siphon tube 314 in the area of ball 332. Insertion of deflector plate 390 changes the flow of beer, forcing the beer to flow more directly into the container. Deflector plate 390 may take one of several forms. It may be a transverse plate which is held in position by first coil spring 310, as illustrated in FIG. 4, or it may be a plate that is an integral part of siphon tube 314. (Such an embodiment is illutrated in FIG. 7 with reference to an extractor tube according to the present invention).

Figure 13:
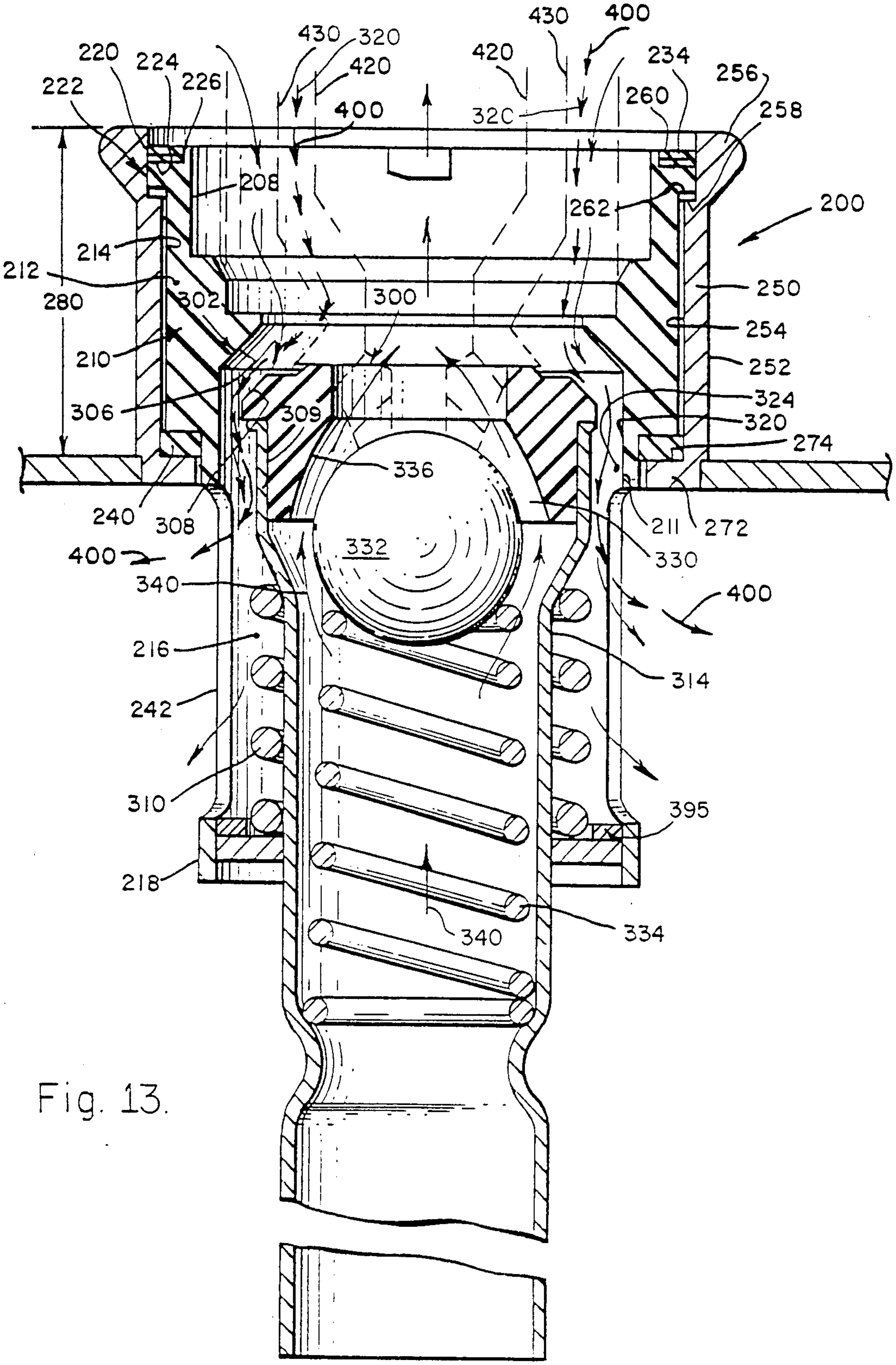
FIG. 13 is a cross-sectional elevation of an extractor tube according to the prior art as disclosed in FIG. 1, but including a washer-like transverse deflector plate transversely affixed to the depending basket below and adjacent to at least one opening in the basket.

Another improvement is prior art extractor tube assemblies 200 such as that shown in FIG. 1 is shown in the cross-sectional elevational view of FIG. 13. This view is essentially the same as the prior art extractor tube shown in FIG. 1 with the addition of a transverse deflector plate 395 transversely affixed to the depending basket 216 below and adjacent to the at least one opening 242. This can be a circular deflector plate having a central aperture therethrough with the siphon tube 314 penetrating the aperture as shown in FIG. 13. The insertion of deflector plate 395 also changes the flow of beer, forcing the beer to flow more directly into the container.

Deflector plate 190 (FIG. 3) may take one of several different forms. It may be a separate component such as a plate, or ring or washer-like element that is wedged between the valve member 108 and the tip 115 of the siphon tube 114. During assembly, the washer-like element is slipped over the distal end of the siphon tube and lodged between the first compression spring and the widened portion of the siphon tube neck, as a right angle to the longitudinal axis of the siphon tube, and having a perimeter that does not extend beyond basket 16. Second, the deflector plate 190 may be an integral component of the siphon tube 114, which may be a separate washer element that is welded to the siphon tube or may be integrally formed by bending a portion of the siphon tube outwardly to form a flange (See FIG. 7). Third, the deflector plate 190 may be an integrally molded portion of first valve member 108, comprising an outwardly extending circumferential lip at the upper portion of the rubber body of first valve member 108, disposed along the upper (as illutrated in FIG. 8) end of siphon tube 114, creating a modified molded valve member with an integral deflector contained therein.

These nd other preferred embodiments of a deflector means are discussed in greater detailed below.

Figure 5:
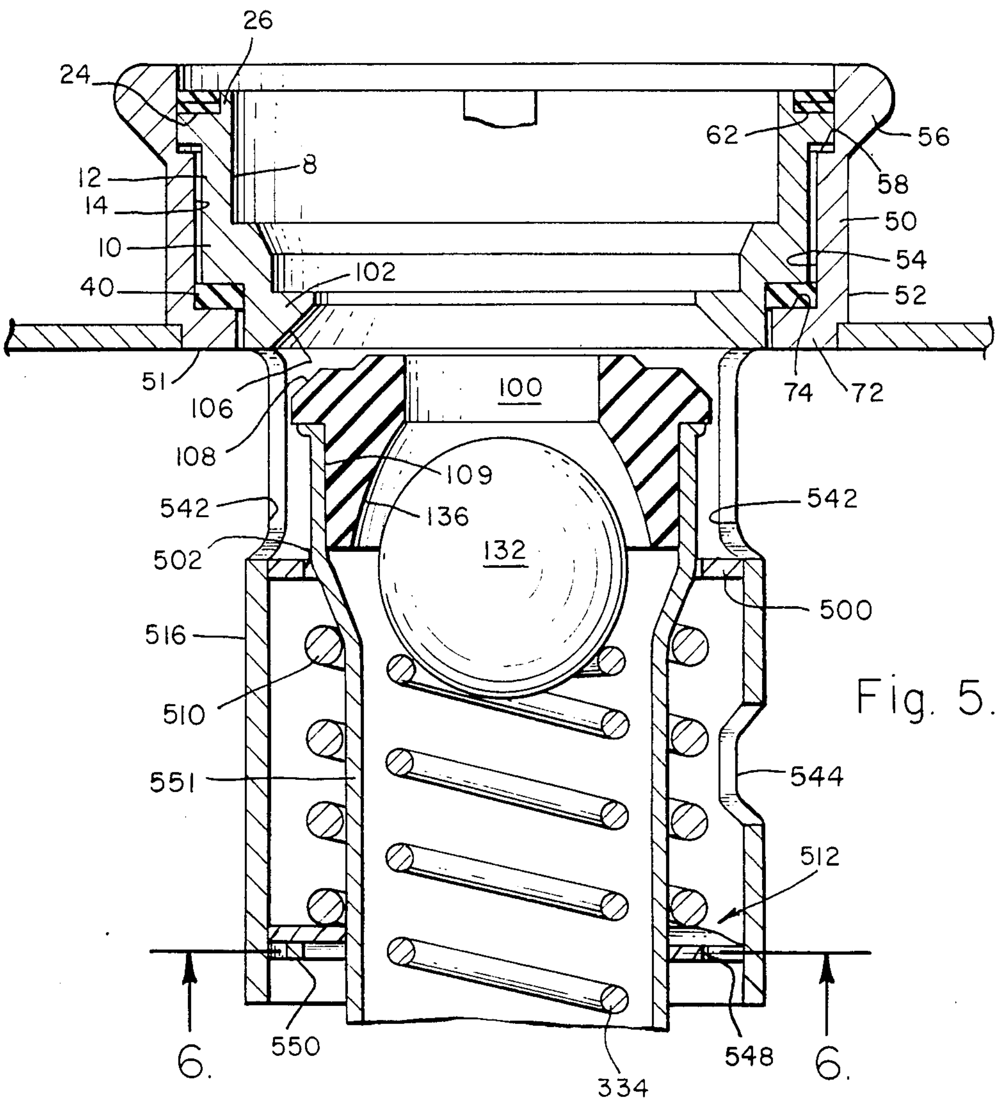
FIG. 5 is a cross-sectional elevation of an extractor tube assembly according to the present invention illustrating a deflector plate and modified basket openings.

FIG. 5 illustrates the present invention short-neck extractor tube (as in FIG. 2) further modified by installation of deflector plate 500, which is an inwardly extending circular lip on basket 516. Deflector plate 500 is a separate washer-like element having its circumference fixed to the interior of basket 516 by welding or the like. Because in this embodiment deflector plate 500 is stationary relative to siphon tube 551, aperture 502 must be large enough not to interfere with the reciprocal motion of movable first valve member 108. A delfector plate 600, which may also be deflector plate 500, is illustrated in plan view in FIG. 10. Beer openings 542, which number four in a preferred embodiment, but may be six or any other convenient number, are wholly above deflector plate 500, in the embodiment of FIG. 5, which prevents incoming beer from contacting first compression spring 510 or retaining plate 512.

In operation, siphon tube 551 moves down (as illustrated in FIG. 5) when the valves are opened, and moves up to the starting position when the valves are closed. This is true of all the siphon tubes discussed herein. Any deflector plate described herein must be designed so that it does not interfere with any movement of any parts of the extractor tube assembly. In the embodiment of FIG. 5, deflector plate 500 lies along the wide neck portion of siphon tube 551, whose sidewall is a regular right cylinder at that point, allowing close tolerance between aperture 502 of deflector plate 500 and siphon tube 551, but still permitting free movement of siphon tube 551.

Figure 6:
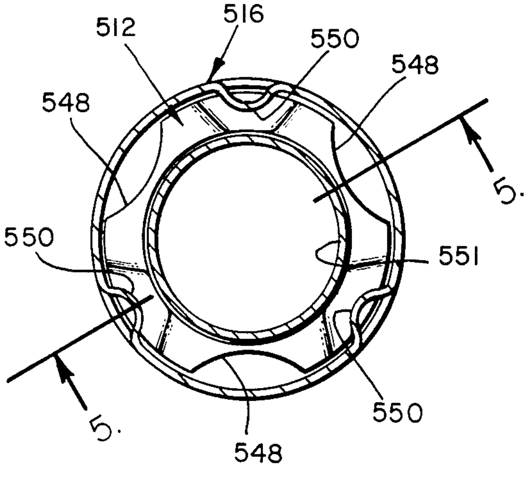
FIG. 6 is a partial bottom plan view of a compression spring retaining plate in place in the bottom of a basket of an extractor tube.

The lower end of basket 516 is open, allowing insertion of first compression spring 510 during assembly. Referring to FIG. 6, retaining plate 512 fits into the open end of basket 516, where it is locked into place by aligning crescent shaped openings 548 in retaining plate 512 with tabs 550 of basket 516, pushing retaining plate 512 up beyond tabs 550, compressing spring 510, and then rotating retaining plate 512 so that crescent shaped openings 548 no longer align with tabs 550. Preferably, there are three tabs 550 and three crescent shaped openings 548, each spaced about 60 degrees apart.

Basket 516 of the embodiment of FIG. 6 is substantially enclosed between deflector plate 500 and retaining plate 512, which makes the extractor tube hard to clean and may lead to contamination. To permit adequate and easy cleaning, retaining plate 512 includes three crescent shaped openings 548, and basket 516 includes cleaning opening 544 between deflector plate 500 and retaining plate 512. Only one cleaning opening 544 is needed.

The deflector plate performs two functions that lead to dramatically improved efficiency in filling beer kegs: first, the deflector plate prevents the beer from gushing directly upward along the siphon tube, where the beer would flow over and around the basket and the first compression spring, creating much turbulence and foaming; and second, the deflector plate deflects the bear outwardly toward the sidewalls of the keg, and away from the filling sensor at the top of the keg, preventing gushing beer and foam from prematurely tripping the sensor. It is important to emphasize that empirical tests indicate that the deflector plate does deflect the beer into substantially a horizontal flow path inside the keg because it may appear from the drawings or from an examination of the apparatus that the deflector plate is not large enough to have the significant effect that it does.

All deflector plates, regardless of their precise location along the siphon tube or the manner or exact place of attachment to the extractor tube prevents most of beer 400 from flowing upward into the upper (in the filling position) portion of a basket 16, as illustrated in FIG. 2, thereby reducing turbulence caused by beer flowing over spring 310 and through openings 42 in basket 16. Further improvements in efficiency can be achieved by providing a modified basket 516 (FIG. 5). These observations also apply whether the deflector plate is installed on the short-neck extractor tube of the present invention, or on existing extractor tubes according to the prior art.

Figure 7:
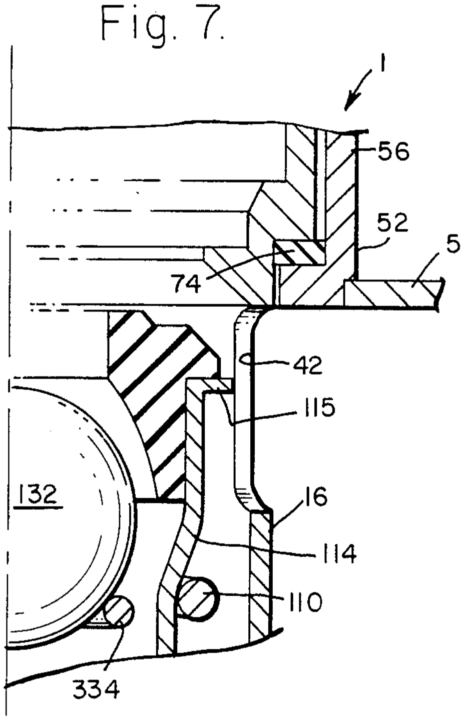
FIG. 7 is a fragmentary cross-sectional elevation of a deflector plate integrally formed as a portion of the siphon tube according to the present invention, installed in an extractor tube according to the present invention.

Referring to FIG. 7, short-neck extractor tube assembly 1 (shown more completely in FIG. 2) includes siphon tube 114 having deflector plate 115 formed integrally from a portion of the upper end of siphon tube 114, by swaging or pressing or other suitable method of metalworking. Deflector plate 115, consists of an outwardly projecting flange about the circumference of the top of siphon tube 114. Deflector plate 115, or flange, does not extend beyond basket 16, but is wholly retained within the interior wall surface of basket 16, allowing for easy assembly.

Figure 8:
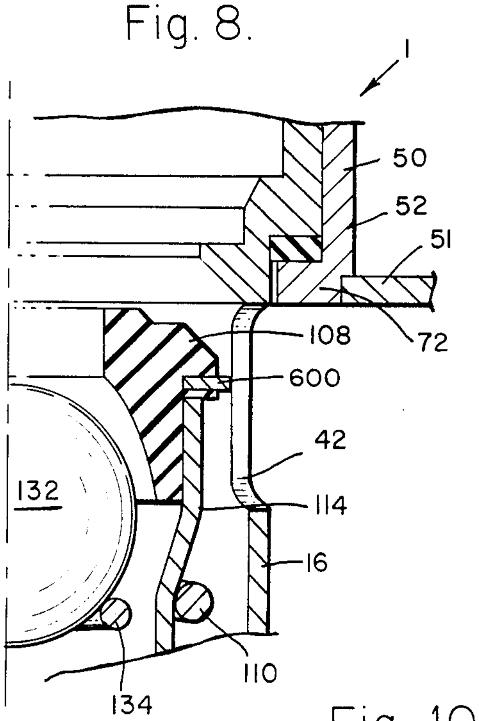
FIG. 8 is a fragmentary cross-sectional elevation of an extractor tube according to the present invention including a deflector plate consisting of a separate element attached to the top of the siphon tube.

Referring to FIG. 8, short-neck extractor tube assembly 1 (shown more completely in FIG. 2) includes siphon tube 114 having deflector plate 600 (See FIG. 10) secured to the top of siphon tube 114 by welding, or other conventional means. Alternatively, deflector plate 600 having a central aperture 601, is molded into moveable first valve member 108, which is a resilient rubber-like material well known in the art, during manufacture. Deflector plate 600 is wholly retained within the interior wall surface of basket 16.

Figure 9:
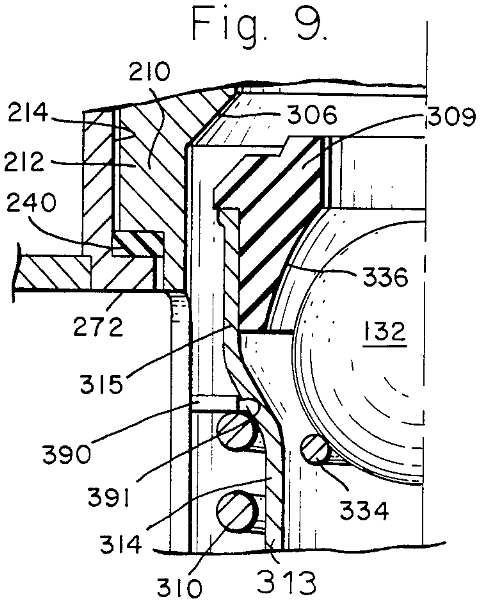
FIG. 9 is a fragmentary cross-sectional elevation of an alternative embodiment of the deflector plate in position on a siphon tube according to the prior art.
Figure 10:
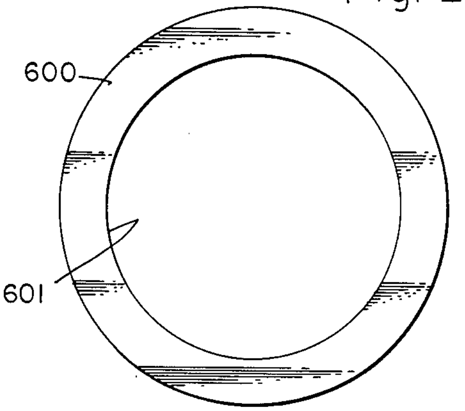
FIG. 10 is a plan view of a deflector plate according to the present invention.

Referring to FIG. 9, deflector plate 390, having the same general configuration as deflector plate 600 of FIG. 10, is installed on siphon tube 314 of a prior art extractor tube (as in FIG. 1) during assembly by sliding deflector plate 390 onto siphon tube 314 prior to installation of first compression spring 310. Central aperture 391 of deflector plate 390 fits over elongated depending portion 313 of siphon tube 314, but is too small to fit over conical neck portion 315 of siphon tube 314. Deflector plate 390 is therefore held in place along siphon tube 314 by first compression spring 310, transverse to the longitudinal axis of siphon tube 314. Deflector plate 390 is preferably made of stainless steel sheet metal and is manufactured by stamping. Other metals may be used.

In actual use, deflector plate 390 installed in the manner described in the preceding paragraph and illustrated in FIG. 9 is sometimes knocked askew by the opening and closing of the valves and the forces exerted by the inflowing beer. Deflector plate 390, however, must remain transverse to siphon tube 314 to provide its full benefit. This problem is solved by providing a means for effecting a positive stop that prevents deflector plate 390 from riding up on siphon tube 314 any further than intended in a particular design, and insuring that deflector plate 390 remains transverse to siphon tube 314 at all times.

Figure 11:
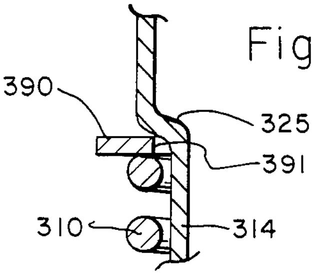
FIG. 11 is a fragmentary cross-sectional elevation of a portion of the siphon tube and deflector plate illustrating a circumferential landing for positive seating of the deflector plate.

Referring to FIG. 11, a circumferential landing 325, which is formed in siphon tube 314 by swaging or other metalworking method well known in the art, provides a positive seat for deflector plate 390. First compression spring 310 then maintains deflector plate 390 transverse to siphon tube 314 under most conditions.

Figure 12:
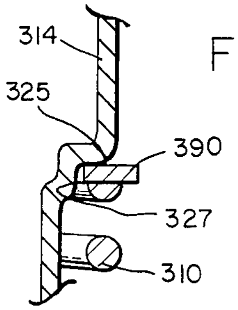
FIG. 12 is a fragmentary cross-sectional elevation of a portion of the siphon tube and deflector plate illustrating a circumferential landing having a plurality of protruding dimples for more positive seating of the deflector plate about the siphon tube.

It has been found, however, that occasionally circumferential landing 325 (FIG. 11) does not assure proper positive seating of deflector plate 390 because it is not possible to bend siphon tube 314 sharply to provide a truly flat, sharply defined landing. In the best mode known to the inventors for practicing this embodiment, landing 325 is further refined by providing a plurality of protruding dimples 327 spaced about the circumference of siphon tube 314 below and adjacent to landing 325, as illustrated in FIG. 12. The combination of landing 325 and protruding dimples 327 insures that deflector plate 390 is properly seated by force from first compression spring 310 at all times. The positive seating means illustrated in FIG. 11 or in FIG. 12 may be used with either prior art extractor tubes or extractor tubes according to the prevent invention.

All deflector plates according to the present invention may conveniently be made of sheetmetal, which may conveniently be stainless steel, or other material that will not significantly deteriorate in beer or other liquid, and will not contaminate beverages intended for human consumption. Deflector plates according to the present invention may fit entirely within the depending basket attached to the siphon tube, as illustrated in FIGS. 5, 7, 8, and 9, which is the configuration that has provided the greatest benefits overall, including consideration of the cost to manufacture, ease of assembly and increased efficiency in filling beer kegs. Deflector plates according to the prevent invention may be stamped from sheetmetal.

Of course, the present invention is not intended to be restricted to any particular form or arrangement, or any specific embodiment disclosed herein, or any specific use, since the same way be modified in various particulars or relations without departing from the spirit or scope of the claimed invention, of which the apparatus shown are intended only for illustration and for disclosure of an operative embodiment and not to show all of the forms which the invention might take.

The invention has been described in considerable detail to comply with the patent laws by providing a full public disclosure of the best mode for practising the invention now known to the inventor. This detailed description is not intended in any way to limit the scope of the patent property to be granted.

What is claimed is:

1. An extractor tube assembly for use with a container which includes sidewalls, comprising:

a. a valve neck for attaching said extractor tube assembly to the container, said valve neck comprising an upper and lower surface;

b. a valve body retained within said valve neck;

c. a valve housing member attached to said valve body adjacent to the lower surface of said valve neck, said valve housing member depending from said valve body and including a depending basket portion having at least one opening therein;

d. a first valve assembly including a first valve seat and a movable first valve member, both seated within said valve body;

e. an elongated siphon tube attached to said moveable first valve member;

f. retaining means for retaining said moveable first valve member against said first valve seat to maintain said first valve assembly in a normally closed position;

g. a second valve assembly seated within said first valve assembly;

h. said elongated siphon tube further comprising an elongated cylindrical portion and a widened neck portion at the top of said elongated siphon tube; and i. deflector means comprising a deflector plate retained between said widened neck portion of said elongated siphon tube and said retaining means;

j. whereby when said first valve assembly is in an opened position, a flow path for fluid is defined such that fluid enters the extractor tube assembly, travels in the flow path defined between said first valve seat and said first valve member, is deflected by said deflector means and then travels directly out said at least one opening in said depending basket portion of said valve housing member and against said sidewalls of the container and thereafter into the container.

2. An extractor tube assembly in accordance with claim 1 wherein said deflector means further comprises a circular disk having a central circular aperture therein.

3. An extractor tube assembly in accordance with claim 2 wherein said deflector means is formed of stainless steel.

4. An extractor tube assembly in accordance with claim 1 wherein said deflector means further comprises a circumferential landing about said elongated siphon tube, said deflector plate being seated below and adjacent to said circumferential landing.

5. An extractor tube assembly in accordance in claim 4 wherein said deflector means further comprises a plurality of spaced protruding dimples in said elongated siphon tube below and adjacent to said circumferential landing, said deflector plate being seated about said protruding dimples.

6. An extractor tube assembly for use with a container which includes sidewalls, comprising:

a. a valve neck for attaching said extractor tube assembly to the container, said valve neck comprising an upper and lower surface;

b. a valve body retained within said valve neck;

c. a valve housing member attached to said valve body adjacent to the lower surface of said valve neck, said valve housing member depending from said valve body and including a depending basket portion having at least one opening therein;

d. a first valve assembly including a first valve seat and a moveable first valve member, both seated within said valve body;

e. an elongated siphon tube attached to said moveable first valve member;

f. retaining means for retaining said moveable first valve member against said first valve seat in a normally closed position;

g. a second valve assembly seated within said first valve assembly; and h. deflector means comprising a deflector plate transversely affixed to said depending basket portion below and adjacent to said at least one opening;

i. whereby when said first valve assembly is in an opened position, a flow path for fluid is defined such that fluid enters the extractor tube assembly, travels in the flow path defined between said first valve seat and said first valve member, a portion of the fluid travels directly out the adjacent said at least one opening of said depending basket portion of said housing member and into the container and a portion of the fluid is deflected by said deflector means and then travels directly out said at least one opening in said depending basket portion of said valve housing member and against said sidewalls of the container and thereafter into the container.

7. An extractor tube assembly in accordance with claim 6 wherein said deflector means further comprises a circular deflector plate having a central aperture therethrough, said elongated siphon tube penetrating said aperture.

8. An extractor tube assembly for use with a container which includes sidewalls, comprising:

a. a valve neck for attaching said extractor tube assembly to the container, said valve neck comprising an upper and lower surface;

b. a valve body retained within said valve neck;

c. a valve housing member attached to said valve body adjacent to the lower surface of said valve neck, said valve housing member depending from said valve body and including a depending basket portion having at least one opening therein;

d. a first valve assembly including a first valve seat and a moveable first valve member, both seated within said valve body at a location adjacent to an intersection of the valve body and valve housing member;

e. an elongated siphon tube attached to said moveable first valve member;

f. retaining means for retaining said moveable first valve member against said first valve seat to maintain said first valve assembly in a normally closed position;

g. a second valve assembly seated within said first valve assembly; and h. a deflector means comprising a circular deflection plate having a central aperture therein, said siphon tube penetrating said aperture, said deflector plate being retained along said siphon tube by said retaining means.

9. An extractor tube assembly in accordance with claim 8 wherein said deflector means further comprises a circumferential landing about said siphon tube, said deflector plate being seated below and adjacent to said landing.

10. An extractor tube assembly in accordance with claim 9 wherein said deflector means further comprises a plurality of spaced protruding dimples in said siphon tube below and adjacent to said landing, said deflector plate being seated about said protruding dimples.

11. An extractor tube assembly for use with a container which includes sidewalls, comprising:

a. a valve neck for attaching said extractor tube assembly to said container, said valve neck comprising an upper and lower surface;

b. a valve body retaining within said valve neck;

c. a valve housing member attached to said valve body adjacent the lower surface of said valve neck, the valve housing member depending from said valve body and including a depending basket portion having at least one opening therein, said at least one opening disposed adjacent to the intersection of the valve body and the valve housing member and below said valve neck, to thereby form a three way intersection of said valve body, said valve housing member and said at least one opening in said depending basket portion;

d. a first valve assembly including a first valve seat and a first valve member, both seated within said valve body at a location adjacent a three way intersection of said valve body, said valve housing member and said at least one opening in said depending basket portion;

e. an elongated siphon tube attached to said moveable first valve member;

f. retaining means for retaining said first valve member against said first valve seat to maintain said first valve assembly in a normally closed position;

g. a second valve assembly seated within said first valve assembly; and h. a deflector means comprising a circular plate having a central aperture therethrough, said deflector plate being transversely disposed along said siphon tube within said basket portion below and adjacent to said at least one opening in said basket portion and retained by said retaining means;

i. whereby when said first valve assembly is in an opened position, a flow path for fluid is defined such that fluid enters the extractors tube assembly, travels in the flow path defined between said first valve seat and said first valve member, and then travels directly out the adjacent said at least one opening in said valve housing member and into the container.

12. An extractor tube in accordance with claim 11 wherein said deflector means further comprises a circumferential landing about said siphon tube, said deflector plate being seated below and adjacent to said landing.

13. An extractor tube in accordance with claim 12 wherein said deflector means further comprises a plurality of spaced protruding dimples in said siphon tube and adjacent to said landing, said deflector plate being seated about said protruding dimples.

14. An extractor tube assembly for use with a container which includes sidewalls, comprising:

a. a valve neck for attaching said extractor tube assembly to said container, said valve neck comprising an upper and lower surface;

b. a valve body retained within said valve neck;

c. a valve housing member attached to said valve body adjacent the lower surface of said valve neck, the valve housing member depending from said valve body and including a depending basket portion having at least one opening therein, said at least one opening disposed adjacent to the intersection of the valve body and the valve housing member and below said valve neck, to thereby form a three way intersection of said valve body, said valve housing member and said at least one opening in said depending basket portion;

d. a first valve assembly including a first valve seat and a first valve member, both seated within said valve body at a location adjacent a three way intersection of said valve body, said valve housing member and said at least one opening in said depending basket portion;

e. an elongated siphon tube attached to said moveable first valve member;

f. retaining means for retaining said first valve member against said first valve seat to maintain said first valve assembly in a normally closed position;

g. a second valve assembly seated within said first valve assembly; and h. a deflector means comprising a transverse deflector plate affixed to said basket portion adjacent to and below said at least one opening;

i. whereby when said first valve assembly is in an opened position, a flow path for fluid is defined such that fluid enters the extractor tube assembly, travels in the flow path defined between said first valve seat and said first valve member, a portion of the fluid travels directly on the adjacent said at least one opening of said depending basket portion of said housing member and into the container and a portion of the fluid is deflected by said deflector means and the travels directly out said at least one opening in said depending basket portion of said valve housing member and against said sidewalls of the container and thereafter into the container.

15. An extractor tube assembly in accordance with claim 14 wherein said cylindrical basket portion further comprises at least one second opening below said deflector plate and a plurality of apertures in a bottom of the basket.

16. An extractor tube assembly for use with a container which includes sidewalls, comprising:

a. a valve neck for attaching said extractor tube assembly to said container, said valve neck comprising an upper and lower surface;

b. a valve body retained within said valve neck;

c. a valve housing member attached to said valve body adjacent the lower surface of said valve neck, the valve housing member depending from said valve body and including a depending basket portion having at least one opening therein, said at least one opening disposed adjacent to the intersection of the valve body and the valve housing member and below said valve neck, to thereby form a three way intersection of said valve body, said valve housing member and said at least one opening in said depending basket portion;

d. a first valve assembly including a first valve seat and a first valve member, both seated within said valve body at a location adjacent a three way intersection of said valve body, said valve housing member and said at least one opening in said depending basket portion;

e. an elongated siphon tube attached to said moveable first valve member;

f. retaining means for retaining said first valve member against said first valve seat to maintain said first valve assembly in a normally closed position;

g. a second valve assembly seated within said first valve assembly; and h. a deflector means comprising a circular plate having a central aperture therethrough and embedded within said moveable valve member;

i. whereby when said first valve assembly is in an opened position, a flow path for fluid is defined such that fluid enters the extractor tube assembly, travels in the flow path defined between said first valve seat and said first valve member, is deflected by said deflector means and then travels directly out the adjacent said at least one opening in said valve housing member and against said sidewalls of the container and thereafter into the container.

17. An extractor tube assembly for use with a container which includes sidewalls, comprising:

a. a valve neck for attaching said extractor tube assembly to said container, said valve neck comprising an upper and lower surface;

b. a valve body retained within said valve neck;

c. a valve housing member attached to said valve body adjacent the lower surface of said valve neck, the valve housing member depending from said valve body and including a depending basket portion having at least one opening therein, said at least one opening disposed adjacent to the intersection of the valve body and the valve housing member and below said valve neck, to thereby form a three way intersection of said valve body, said valve housing member and said at least one opening in said depending basket portion;

d. a first valve assembly including a first valve seat and a first valve member, both seated within said valve body at a location adjacent a three way intersection of said valve body, said valve housing member and said at least one opening in said depending basket portion;

e. an elongated siphon tube attached to said moveable first valve member;

f. retaining means for retaining said first valve member against said first valve seat to maintain said first valve assembly in a normally closed position;

g. a second valve assembly seated within said first valve assembly; and h. a deflector means comprising a circumferential outwardly projecting flange portion of a lip at the top of said elongated siphon tube adjacent said first valve member;

i. whereby when said first valve assembly is in an opened position, a flow path for fluid is defined such that fluid enters the extractor tube assembly, travels in the flow path defined between said first valve seat and said first valve member, is deflected by said deflector means and then travels directly out the adjacent said at least one opening in said valve housing member and against said sidewalls of the container and thereafter into the container.

18. An extractor tube assembly for use with a container which includes sidewalls, comprising:

a. a valve neck for attaching said extractor tube assembly to the container, said valve neck comprising an upper and lower surface;

b. a valve body retained within said valve neck;

c. a valve housing member attached to said valve body adjacent to the lower surface of said valve neck, said valve housing member depending from said valve body and including a depending basket portion having at least one opening therein;

d. a first valve assembly including a first valve seat and a moveable first valve member, both seated within said valve body;

e. an elongated siphon tube attached to said moveable first valve member;

f. retaining means for retaining said moveable first valve member against said first valve seat to maintain said first valve assembly in a normally closed position;

g. a second valve assembly seated within said first valve assembly; and h. means for deflecting at least a portion of the fluid flowing into the container outward of said siphon tube toward the sidewalls of the container;

i. whereby when said first valve assembly is in an opened position, a flow path for fluid is defined such that fluid enters the extractor tube assembly, travels in the flow path defined between said first valve seat and said first valve member, is deflected by said means for deflecting fluid so that at least a portion of the fluid travels directly out said at least one opening said depending basket portion of said valve housing member and against said sidewalls of the container and thereafter into the container.

19. An extractor tube assembly for use with a container which includes sidewalls, comprising:

a. a valve neck for attaching said extractor tube assembly to said container, said valve neck comprising an upper and lower surface;

b. a valve body retained within said valve neck;

c. a valve housing member attached to said valve body adjacent the lower surface of said valve neck, the valve housing member depending from said valve body and including a depending basket portion having at least one opening therein, said at least one opening disposed adjacent to the intersection of the valve body and the valve housing member and below said valve body, to thereby form a three way intersection of said valve body, said valve housing member and said at least one opening in said depending basket portion;

d. a first valve assembly including a first valve seat and a first valve member, both seated within said valve body at a location adjacent a three way intersection of said valve body, said valve housing member and said at least one opening in said depending basket portion;

e. an elongated siphon tube attached to said moveable first valve member;

f. retaining means for retaining said first valve member against said first valve seat to maintain said first valve assembly in a normally closed position;

g. a second valve assembly seated within said first valve assembly; and h. means for deflecting the fluid flowing into the container outward of said siphon tube toward the sidewalls of the container;

i. whereby when said first valve assembly is in an opened position, a flow path for fluid is defined such that fluid enters the extractor tube assembly, travels in the flow path defined between said first valve seat and said first valve member, a portion of the fluid travels directly out the adjacent said at least one opening of said depending basket portion of said housing member and into the container and a portion of the fluid is deflected by said means for deflecting fluid and then travels directly out said at least one opening in said depending basket portion of said valve housing member and against said sidewalls of the container and thereafter into the container.

20. An extractor tube assembly for use with a container which includes sidewalls, comprising:

a. a valve neck for attaching said extractor tube assembly to said container, said valve neck comprising an upper and lower surface;

b. a valve body retained within said valve neck;

c. a valve. housing member attached to said valve body adjacent the lower surface of said valve neck, the valve housing member depending from said valve body and including a depending basket portion having at least one opening therein, the top of said at least one opening disposed adjacent to an intersection of the bottom of the valve body and the top of the valve housing member and below said valve neck, to thereby form a three way intersection of the bottom of said valve body, the top of said valve housing member and the top of said at least one opening in said depending basket portion and wherein said three way intersection is adjacent the lower surface of said valve neck;

d. a first valve assembly including a first valve seat and a first valve member, both seated within said valve body at a location adjacent a three way intersection of the bottom of said valve body, the top of said valve housing member and the top of said at least one opening in said depending basket portion;

e. an elongated siphon tube attached to said moveable first valve member;

f. retaining means for retaining said first valve member against said first valve seat to maintain said first valve assembly in a normally closed position; and g. a second valve assembly seated within said first valve assembly;

h. whereby when said first valve assembly is in an opened position, a flow path for fluid is defined such that fluid enters the extractor tube assembly, travels in the flow path defined between said first valve seat and said first valve member, and then travels directly out an adjacent said at least one opening in said depending basket portion of said valve housing member and into the container.

* * * * *